US011645256B2

(12) United States Patent
Yeo et al.

(10) Patent No.: US 11,645,256 B2
(45) Date of Patent: *May 9, 2023

(54) ENCRYPTED SEARCH WITH NO ZERO-DAY LEAKAGE

(71) Applicant: Google LLC, Mountain View, CA (US)

(72) Inventors: Kevin Yeo, Mountain View, CA (US); Ahmet Erhan Nergiz, Mountain View, CA (US); Nicolas Lidzborski, Belmont, CA (US); Laetitia Estelle Baudoin, Mountain View, CA (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,533

(22) Filed: Dec. 3, 2021

(65) Prior Publication Data
US 2022/0092047 A1    Mar. 24, 2022

Related U.S. Application Data

(63) Continuation of application No. 16/712,151, filed on Dec. 12, 2019, now Pat. No. 11,216,433.

(51) Int. Cl.
*H04L 29/06* (2006.01)
*G06F 16/22* (2019.01)
(Continued)

(52) U.S. Cl.
CPC ...... *G06F 16/2255* (2019.01); *G06F 16/2246* (2019.01); *G06F 16/242* (2019.01);
(Continued)

(58) Field of Classification Search
None
See application file for complete search history.

(56) References Cited

U.S. PATENT DOCUMENTS

| 6,009,177 A | 12/1999 | Sudia | |
|---|---|---|---|
| 8,594,329 B2 * | 11/2013 | Vaikuntanathan | ........ H04L 9/30 713/168 |

(Continued)

OTHER PUBLICATIONS

International Search Report, PCT/US2020/064701, dated Mar. 31, 2021, 15 pages.
(Continued)

*Primary Examiner* — Maung T Lwin
(74) *Attorney, Agent, or Firm* — Honigman LLP; Brett A. Krueger

(57) ABSTRACT

A method for providing encrypted search includes receiving, at a user device associated with a user, a search query for a keyword that appears in one or more encrypted documents stored on an untrusted storage device and accessing a count table to obtain a count of documents that include the keyword. The method also includes generating a delegatable pseudorandom function (DPRF) based on the keyword, a private cryptographic key, and the count of documents. The method also includes evaluating a first portion of the DPRF and delegating a remaining second portion of the DPRF to the untrusted storage device which causes the untrusted storage device to evaluate the DPRF and access an encrypted search index associated with the documents. The untrusted storage device determines one or more encrypted documents associated with DPRF and returns, to the user device, an identifier for each encrypted document associated with the DPRF.

20 Claims, 10 Drawing Sheets

(51) Int. Cl.
*G06F 16/242* (2019.01)
*G06F 16/2455* (2019.01)
*H04L 9/06* (2006.01)
*H04L 9/08* (2006.01)
*H04L 9/00* (2022.01)
*G06F 21/60* (2013.01)

(52) U.S. Cl.
CPC ........ *G06F 16/2455* (2019.01); *G06F 21/602* (2013.01); *H04L 9/006* (2013.01); *H04L 9/0656* (2013.01); *H04L 9/0861* (2013.01)

(56) References Cited

U.S. PATENT DOCUMENTS

| | | | |
|---|---|---|---|
| 9,111,106 B2 * | 8/2015 | Matsuda | ............... H04L 9/0894 |
| 9,712,320 B1 | 7/2017 | Kiayias et al. | |
| 10,572,352 B2 * | 2/2020 | Basu | ..................... H04L 9/0894 |
| 10,769,295 B2 | 9/2020 | Loza et al. | |
| 2008/0240447 A1 | 10/2008 | Zhu et al. | |
| 2011/0202766 A1 | 8/2011 | Lerner | |
| 2012/0297201 A1 | 11/2012 | Matsuda et al. | |
| 2012/0324240 A1 | 12/2012 | Hattori et al. | |
| 2017/0026350 A1 | 1/2017 | Dawoud | |
| 2018/0357427 A1 | 12/2018 | Lindell et al. | |

OTHER PUBLICATIONS

Patel et al., "Mitigating Leakage in Secure Cloud-Hosted Data Structures Volume Hiding for Multi-Maps via Hashing," Nov. 6, 2019, 15 pages.
Aggelos et al., "Delegatable pseudorandom functions and applications," Nov. 4, 2013, 15 pages.

* cited by examiner

Probability of Inserting a Keyword Into the Count Table

Probability 810 to Enter Keyword into Count Table = 0.02

FIG. 8

ENCRYPTED SEARCH WITH NO ZERO-DAY LEAKAGE

CROSS REFERENCE TO RELATED APPLICATIONS

This U.S. patent application is a continuation of, and claims priority under 35 U.S.C. § 120 from, U.S. patent application Ser. No. 16/712,151, filed on Dec. 12, 2019. The disclosure of this prior application is considered part of the disclosure of this application and is hereby incorporated by reference in its entirety.

TECHNICAL FIELD

This disclosure relates to performing encrypted search with no zero-day leakage.

BACKGROUND

Searchable encryption (i.e., encrypted search) has increased in popularity as storage of large quantities of data in the cloud becomes more common. More and more, a user or client owns a large corpus of encrypted documents that are stored at a server not under the client's control (i.e., the server is untrusted). With searchable encryption, the client can store their encrypted documents on the untrusted server, but still maintain the capability of searching the documents and, for example, retrieve identifiers of all documents containing a specific keyword. However, such searchable encryption often comes with security and privacy drawbacks.

SUMMARY

One aspect of the disclosure provides a method for providing encrypted search with no zero-day leakage. The method includes receiving, at data processing hardware of a user device associated with a user, a search query for a keyword. The keyword appears in one or more encrypted documents within a corpus of encrypted documents stored on an untrusted storage device. The method also includes accessing, by the data processing hardware, a count table to obtain a count of unique documents within the corpus of encrypted documents that include the keyword and generating, by the data processing hardware, a delegatable pseudorandom function (DPRF) based on the keyword, a private cryptographic key, and the count of unique documents that include the keyword. The method also includes evaluating, by the data processing hardware, a first portion of the DPRF and delegating, by the data processing hardware, a remaining second portion of the DPRF to the untrusted storage device. The remaining second portion of the DPRF when received by the untrusted storage device causes the untrusted storage device to evaluate the remaining second portion of the DPRF and access an encrypted search index associated with the corpus of encrypted documents stored on the untrusted storage device. The untrusted storage device also determines one or more encrypted documents within the corpus of encrypted documents associated with the remaining second portion of the DPRF based on the encrypted search index and returns, to the user device, an identifier for each encrypted document of at least a portion of the one or more encrypted documents associated with the remaining second portion of the DPRF.

Implementations of the disclosure may include one or more of the following optional features. In some implementations, generating the DPRF includes generating a binary tree where the binary tree includes a set of nodes that includes a root node and a plurality of other nodes. Each other node includes a non-leaf node or a leaf node. The method may also include where a quantity of leaf nodes of the binary tree is equal to or greater than the count of unique documents that include the keyword.

In some examples, the root node of the binary tree includes a first hash of the private cryptographic key and the keyword. The root node may be associated with a first child node and a second child node, where the first child node includes a first portion of a second hash of the first hash of the private cryptographic key and the keyword, and the second child node includes a second portion of the second hash of the first hash of the private cryptographic key and the keyword. Optionally, the first portion of the second hash concatenated with the second portion of the second hash is equivalent to the second hash of the first hash of the private cryptographic key and the keyword.

Each leaf node of the set of nodes of the binary tree may be associated with a value stored in the encrypted search index. Each other node of the set of nodes of the binary tree may include a portion of a hash of a parent node associated with the corresponding other node. In some implementations, evaluating the first portion of the DPRF includes evaluating a first subset of the set of nodes of the binary tree. When the untrusted storage device evaluates the remaining second portion of the DPRF, the untrusted storage device evaluates a second subset of the set of nodes of the binary tree. The second subset includes different nodes from the set of nodes of the binary tree than the first subset.

In some examples, the method further includes, for each unique keyword of a new encrypted document uploaded by the user into the corpus of encrypted documents stored on the untrusted storage device, incrementing, by the data processing hardware, the count of unique documents within the corpus of encrypted documents that include the corresponding unique keyword in the count table and generating, by the data processing hardware, a unique keyword hash based on the private cryptographic key, the corresponding unique keyword, and the incremented count of unique documents within the corpus of encrypted documents that include the corresponding unique keyword. The method may also include generating, by the data processing hardware, a hash pair including the unique keyword hash and an encrypted document identifier associated with the new encrypted document uploaded by the user and sending, by the data processing hardware, the hash pair to the untrusted storage device.

When the untrusted storage device returns the identifier for each encrypted document of the at least the portion of the one or more encrypted documents associated with the remaining second portion of the DPRF, the untrusted storage device may return encrypted metadata associated with each returned identifier.

Another aspect of the disclosure provides a system for providing encrypted search with no zero-day leakage. The system includes data processing hardware of a user device associated with a user and memory hardware in communication with the data processing hardware. The memory hardware stores instructions that when executed on the data processing hardware cause the data processing hardware to perform operations. The operations include receiving a search query for a keyword. The keyword appears in one or more encrypted documents within a corpus of encrypted documents stored on an untrusted storage device. The operations also include accessing a count table to obtain a count of unique documents within the corpus of encrypted documents that include the keyword and generating a delegatable pseudorandom function (DPRF) based on the keyword, a private cryptographic key, and the count of unique documents that include the keyword. The operations also include evaluating a first portion of the DPRF and delegating a remaining second portion of the DPRF to the untrusted storage device. The remaining second portion of the DPRF when received by the untrusted storage device causes the untrusted storage device to evaluate the remaining second portion of the DPRF and access an encrypted search index associated with the corpus of encrypted documents stored on the untrusted storage device. The untrusted storage device also determines one or more encrypted documents within the corpus of encrypted documents associated with the remaining second portion of the DPRF based on the encrypted search index and returns, to the user device, an identifier for each encrypted document of at least a portion of the one or more encrypted documents associated with the remaining second portion of the DPRF.

This aspect may include one or more of the following optional features. In some implementations, generating the DPRF includes generating a binary tree where the binary tree includes a set of nodes that includes a root node and a plurality of other nodes. Each other node includes a non-leaf node or a leaf node. The operations may also include where a quantity of leaf nodes of the binary tree is equal to or greater than the count of unique documents that include the keyword.

In some examples, the root node of the binary tree includes a first hash of the private cryptographic key and the keyword. The root node may be associated with a first child node and a second child node, where the first child node includes a first portion of a second hash of the first hash of the private cryptographic key and the keyword, and the second child node includes a second portion of the second hash of the first hash of the private cryptographic key and the keyword. Optionally, the first portion of the second hash concatenated with the second portion of the second hash is equivalent to the second hash of the first hash of the private cryptographic key and the keyword.

Each leaf node of the set of nodes of the binary tree may be associated with a value stored in the encrypted search index. Each other node of the set of nodes of the binary tree may include a portion of a hash of a parent node associated with the corresponding other node. In some implementations, evaluating the first portion of the DPRF includes evaluating a first subset of the set of nodes of the binary tree. When the untrusted storage device evaluates the remaining second portion of the DPRF, the untrusted storage device evaluates a second subset of the set of nodes of the binary tree.

The second subset includes different nodes from the set of nodes of the binary tree than the first subset.

In some examples, the operations further include, for each unique keyword of a new encrypted document uploaded by the user into the corpus of encrypted documents stored on the untrusted storage device, incrementing the count of unique documents within the corpus of encrypted documents that include the corresponding unique keyword in the count table and generating a unique keyword hash based on the private cryptographic key, the corresponding unique keyword, and the incremented count of unique documents within the corpus of encrypted documents that include the corresponding unique keyword. The operations may also include generating a hash pair including the unique keyword hash and an encrypted document identifier associated with the new encrypted document uploaded by the user and sending the hash pair to the untrusted storage device.

When the untrusted storage device returns the identifier for each encrypted document of the at least the portion of the one or more encrypted documents associated with the remaining second portion of the DPRF, the untrusted storage device may return encrypted metadata associated with each returned identifier.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8 is a schematic view of a plot of a probability of inserting a keyword into the count table.

Like reference symbols in the various drawings indicate like elements.

DETAILED DESCRIPTION

Figure 1:
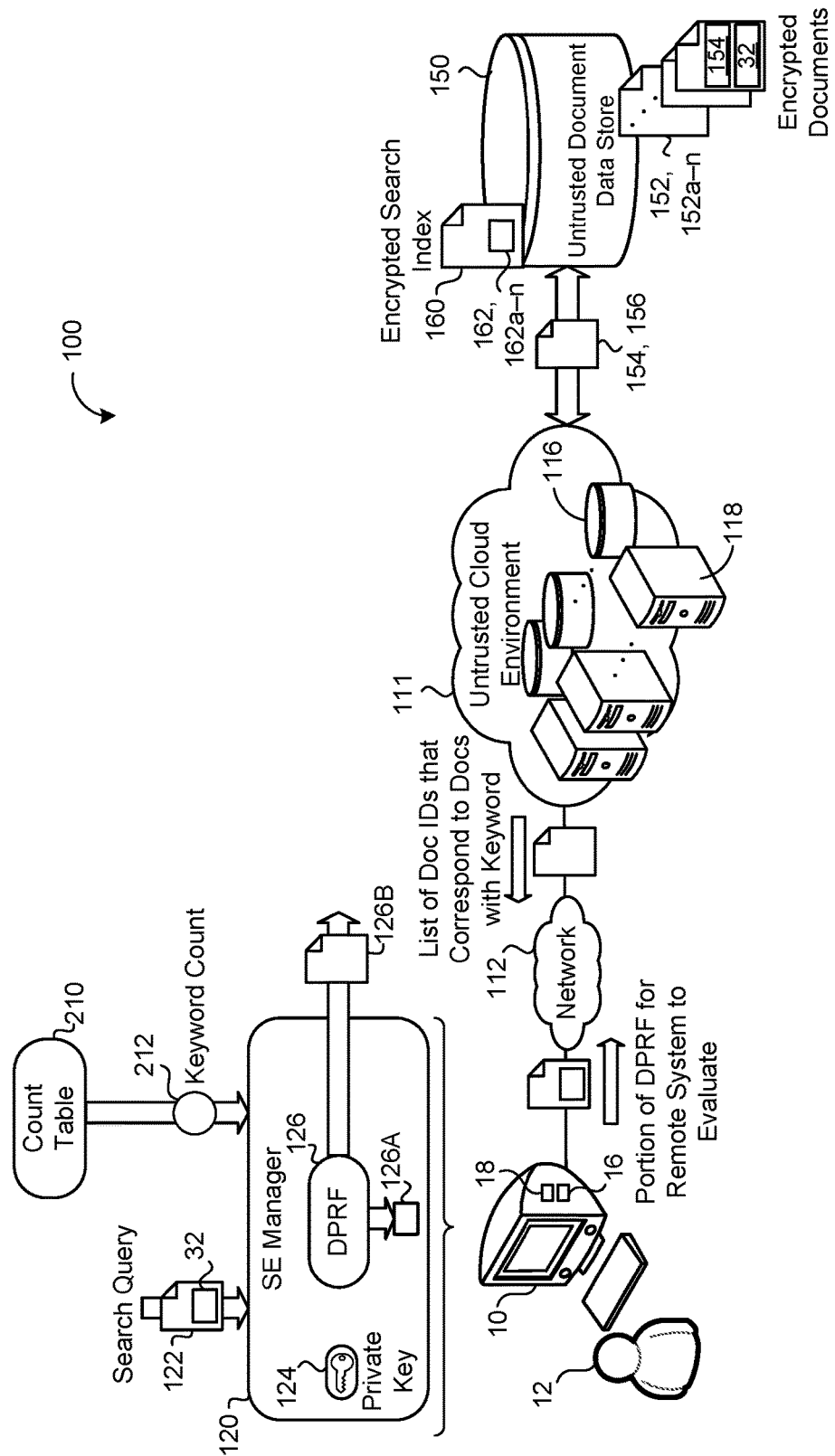
FIG. 1 is a schematic view of an example system that provides encrypted search with no zero-day leakage.

Searchable encryption (which may also be referred to as encrypted search) has been increasing in popularity. The goal of searchable encryption is to enable a client to outsource the storage of a corpus of encrypted documents to an untrusted server. For example, the client may wish to store a large number of documents (or any other item uploaded to the server, such as pictures, emails, etc.) securely in a cloud-based storage solution. The term documents is used generally, and may represent any sort of digital files (e.g., pictures, songs, database entries, etc.). Typically, the client will want to keep the ability to efficiently search the documents (i.e., search for a specific keyword), while simultaneously maintaining the privacy and security of the documents that encryption provides. In order to maintain this privacy, information related to the contents of the documents or the queries from the client must remain hidden from the untrusted server. A common way to address this problem is the creation of a separate encrypted search index that indexes the keywords and associated document identifiers of all of the documents stored on the untrusted server.

This search index is encrypted with a key the untrusted server does not have access to, and then stored along with the documents. The client may then generate a search query that the server evaluates against the encrypted search index. The evaluation results in the encrypted document identifiers associated with the keyword of the search query, which the untrusted server returns to the client. In this way, the client receives a list of document identifiers of documents that include the keyword while minimizing information leakage (e.g., to the untrusted server).

As the untrusted server evaluates the search index in response to queries from the user, the index will gradually leak information about search patterns and, by deploying attacks such as frequency analysis, the server may eventually be able to make informed guesses on the historical searched terms with non-negligible probability. This leakage cannot be efficiently prevented as it is an inherent problem due to the searching repeatedly over the same index.

However, many searchable encryption schemes suffer from a number of additional security or privacy concerns beyond this slow leakage of using the search index. In one example, some schemes are vulnerable to zero-day attacks. A zero-day attack is an attack that reveals or leaks information to an adversary (e.g., the untrusted storage server) before any queries have been processed by the storage server. That is, search queries (i.e., searching for a keyword among the encrypted documents) typically leak at least some information to the server. However, a successful zero-day attack does not require any search queries at all to gain information about the encrypted documents.

For example, some searchable encryption schemes hash each keyword in a document into one or more small values that are attached to each encrypted document. To search for the keyword, each associated hash value may be searched. However, this scheme reveals to the server a frequency table of the number of documents (as well as the identifier of the documents) that contain a specific hash value. For example, a hash value associated with a lot of documents is likely to be a more common word than a hash value that is associated with less documents. This information is revealed to the server before any search queries have been performed. Study has shown that frequency tables can reveal a large number of keywords. While the schemes may attempt to mitigate this weakness (e.g., by adding random terms), a significant amount of noise must be added to ensure that the frequency problem is overcome, which significantly reduces the efficiency of the scheme.

Another common security issue that many searchable encryption schemes are vulnerable to are file-injection attacks. These attacks work on the premise that an adversary may send encrypted documents (e.g., emails) to a target. These emails will contain specific keywords. When the target queries for these specific keywords, the adversary may view which of the injected emails are returned and thus determine the queried keyword. In some instances, the adversary may even hide the identity of the injected emails by hiding keywords that may notify the target via, for example, invisible Hypertext Markup Language (HTML). This attack may be compounded if the adversary is able to save the queries that the target performs (or retrieve queries that were performed from a log). The adversary may then apply all these historical queries to emails that were recently injected (i.e., injected after the queries were performed) to compromise the privacy of queried keywords for historical queries. Thus, when the scheme uses the same hash for all emails in the past or future, the scheme is vulnerable to an adversary applying all previous queries into files that were only injected recently.

In order to mitigate zero-day attacks and file-injection attacks of encrypted documents while maintaining search functionality and efficiency, implementations herein are directed toward an encrypted search scheme using delegatable pseudorandom functions (DPRF) to completely hide frequency tables before any search queries have been performed.

Referring now to FIG. 1, in some implementations, an example system 100 includes a user device 10 associated with a respective user or client 12 and in communication with an untrusted remote system 111 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 111 may be a single computer, multiple computers, or a distributed system (e.g., a cloud environment) having scalable/elastic computing resources 118 (e.g., data processing hardware) and/or storage resources 116 (e.g., memory hardware). An untrusted document data store 150 (i.e., a remote storage device 150) is overlain on the storage resources 116 to allow scalable use of the storage resources 116 by one or more of the client or computing resources 118. The document data store 150 is configured to store a corpus of documents 152, 152a-n. Each document 152 includes a document identifier 154 that uniquely identifies the associated document 152 (e.g., a document name). Each document 152 also includes a set of keywords 32. The set of keywords 32 includes all keywords that appear in the associated encrypted document 152 that the user 12 may search for. As used herein, a document 152 may refer to any item uploaded onto the remote system 111 for storage within the document data store 150, such as, without limitation, emails, calendar events, notes, database entries, pictures, audio files, etc. In some examples, the untrusted storage device 150 stores a corpus of emails 152, and the user 12, via the user device 10, accesses an inbox for receiving and composing emails. In some implementations, the user device 10 executes a Searchable Encryption (SE) manager 120 for managing access to the encrypted documents 152 within the data storage 150.

The user 12 may interact with the SE manager 120 via a software application (e.g., a web browser) executing on the user device 10. A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The SE manager 120 receives, from the user 12, a search query 122 for one or more keywords 32 that appear in one or more of the encrypted documents 152 stored on the untrusted storage device 150. The SE manager 120 accesses a count table 210 to obtain a count 212 of unique documents 152 within the corpus of encrypted documents 152 that include the keyword 32. That is, the count 212 indicates the number of unique documents 152 that the keyword 32 appears in. For example, when the queried keyword 32 is "cat", and "cat" appears in 526 different documents 152 stored on the storage device 150 and associated with the user 12, the count 212 would be 526.

Figure 2:
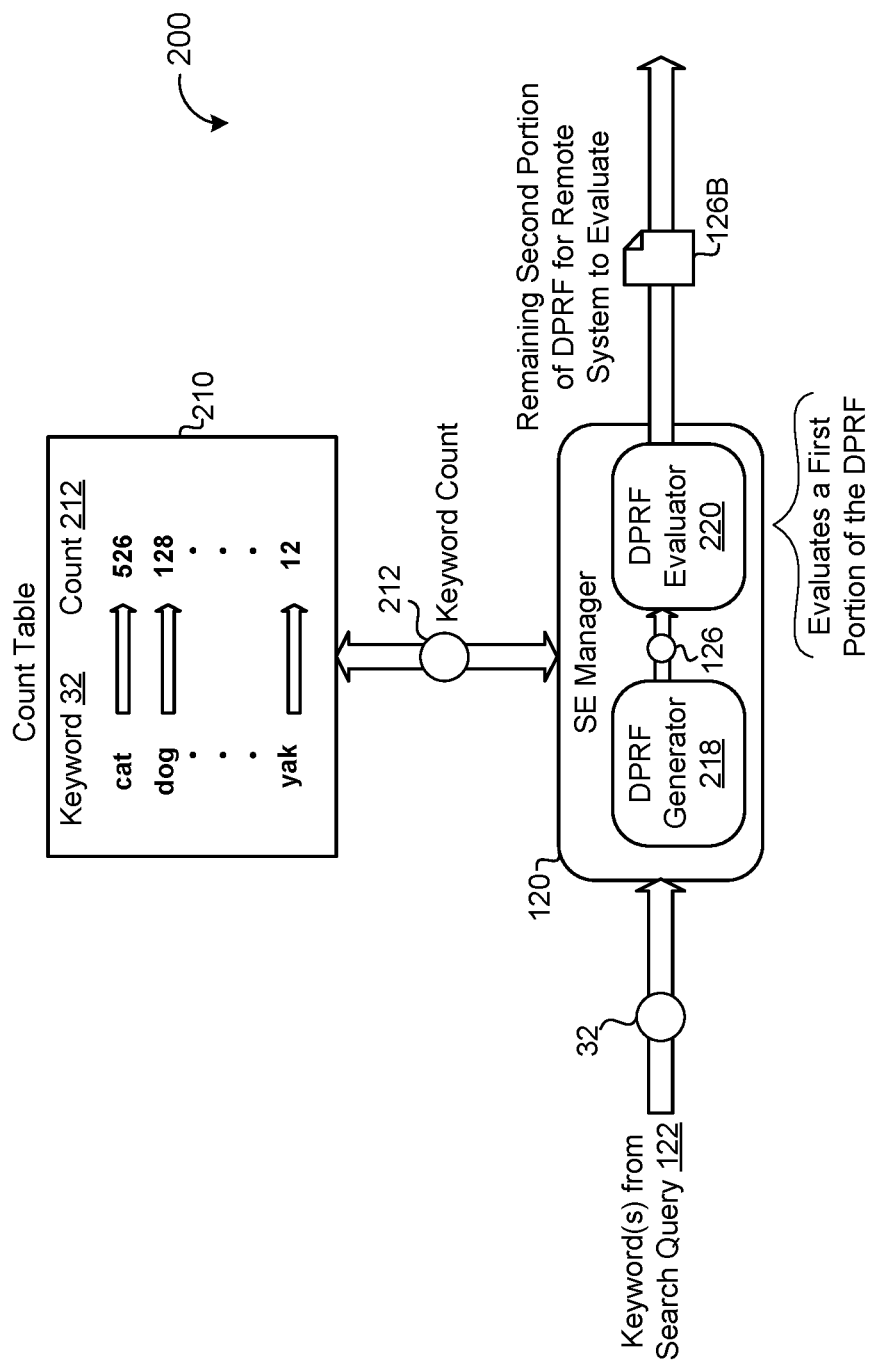
FIG. 2 is a schematic view of exemplary components of a searchable encryption manager.

Referring now to FIG. 2, a schematic view 200 shows the SE manager 120 receiving the keyword count 212 of the queried keyword 32 from the count table 210. The count table 210 includes a count 212 of how many different documents 152 that the keyword 32 appears in. In the illustrated example, the keyword "cat" appears in 526 documents 152, the keyword "dog" appears in 128 different documents 152, and the keyword "yak" appears in 12 different documents 152. In some examples, the count table 210 may be encrypted and the SE manager 120 may decrypt either the count table 210 and/or count 212 using a cryptographic key. As discussed in more detail below with reference to FIG. 7, the count table 210 may be stored locally at the user device 10 or remotely (e.g., at the untrusted storage device 150). To maintain privacy, the count table 210 must remain secret, and therefore will generally be encrypted, especially when stored remotely from the user device 10.

Referring back to FIG. 1, the SE manager 120 also obtains a private cryptographic key 124. In some examples, the SE manager 120 generates the private key 124. In other examples, the SE manager 120 retrieves or receives the private key 124 from the user device 10 or from a third-party (e.g., a third-party key management service). The SE manager 120 generates a delegatable pseudorandom function 126 (DPRF) based on the keyword 32, the private cryptographic key 124, and the count 212 of unique documents 152 that include the keyword 32. When the user 12 queries for more than one keyword 32, the SE manager 120 may generate a separate DPRF 126 for each keyword 32.

As used herein, a DPRF is a function that, using an in input cryptographic key K and an input x, generates an output F(K, x) that appears random to any party that does not have access to the key K. Specifically, the DPRF 126 allows for delegation of evaluation of a strict subset of the domain of the function to an untrusted proxy without the proxy being able to evaluate the function outside of the strict subset.

As an example, assume that a user desires to retrieve values stored on a server that are associated with a large number of outputs from the function F. That is, the user wants the server to retrieve or evaluate values associated with $F(K, x_1), \ldots, F(K, x_m)$ that are stored on the server. The user could simply send the function F, the key K, and the range of values for x to the server and the server could evaluate the range of values for x to obtain the outputs. However, in this scenario, the server then could evaluate the function F for any value of x, as the server has access to the key K. Another possible avenue for the user is to evaluate each value of x themselves and then send each output to the server. While this limits the information the server receives, it requires sending of m outputs, which is highly inefficient.

Ideally, the user would like to minimize the amount of information the user must send the server while also minimizing the amount of information the server learns. The DPRF 126, as described in more detail with regards to FIG. 3 below, is a function that bounds the server from evaluating values of x outside of a specified range, thus limiting the amount of information the sever gains. For example, when the user sends the range values of $x_1$ to $x_m$ for the sever to evaluate, the server will not be able to evaluate the function F for values of x less than $x_1$ and for values of x greater than $x_m$. To establish these bounds, the SE manager 120 evaluates a first portion 126A of the DPRF 126 and delegates a remaining second portion 126B of the DPRF to the untrusted storage device 150.

Referring again to FIG. 2, the SE manager 120, in some implementations, includes a DPRF generator 218 and a DPRF evaluator 220. The DPRF generator 218 generates the DPRF 126 for the queried keyword 32 based on the private key 124, the keywords 32, and the keyword count 212 received from the count table 210. The DPRF generator 218 passes the DPRF 126 to the DPRF evaluator 220. The DPRF evaluator 220, as described in more detail below with reference to FIG. 3, evaluates at least a portion of the DPRF 126 (e.g., a first portion 126a), and based on the portion evaluated, delegates (i.e., sends) the remaining second portion 126B to the untrusted remote storage device 150.

Referring back to FIG. 1, the untrusted storage device 150 (i.e., the document data store 150 storing the encrypted documents 152 store), in response to receiving the remaining second portion 126B of the DPRF 126 delegated by the DPRF evaluator of the SE manager 120, evaluates the remaining second portion 126B of the DPRF and accesses an encrypted search index 160 associated with the corpus of encrypted documents 152 stored on the untrusted storage device 150. The storage device 150 determines one or more encrypted documents 152 within the corpus of encrypted documents that are associated with the remaining second portion 126B of the DPRF based on the encrypted search index 160.

The encrypted search index 160, in some implementations, includes a list of entries 162, 162a-n, where each entry 162 includes an association between a keyword 32 and at least one encrypted document identifier 154 that the keyword 32 appears in. The evaluation of the remaining second portion 126B provides the untrusted storage device 150 with one or more of the encrypted keywords 32 associated with one or more encrypted document identifiers 154 without revealing the plaintext keyword or document identifier to the storage device 150. The storage device 150 returns, to the user device 10, an identifier 154 for each encrypted document 152 of at least a portion of the one or more encrypted documents 152 associated with the remaining second portion 126B of the DPRF. That is, in some implementations, the storage device 150 does not return every identifier 154 associated with a document 152 containing the queried keyword 32, and instead only returns a portion (e.g., fifty) of the document identifiers 154. Subsequent queries 122 made by the user 12 may return additional results (e.g., the next fifty document identifiers 154). In some examples, the storage device 150 returns to the user device 10 an empty set (i.e., returns no document identifiers 154) when, for example, the queried keyword 32 does not appear in any of the documents 152.

In some implementations, when the untrusted storage device 150 returns at least a portion of the document identifiers 154 associated with encrypted documents 152 that includes the queried keyword 32, the untrusted storage device also returns encrypted metadata 156 associated with each returned identifier 154. The metadata 156 may include additional relevant or contextual information for the user 12. For example, the metadata 156 may include dates (e.g., a date the document 152 was created or uploaded), the author of the document 152, size of the document 152, a sentence that includes the keyword 32, etc.

Figure 3:
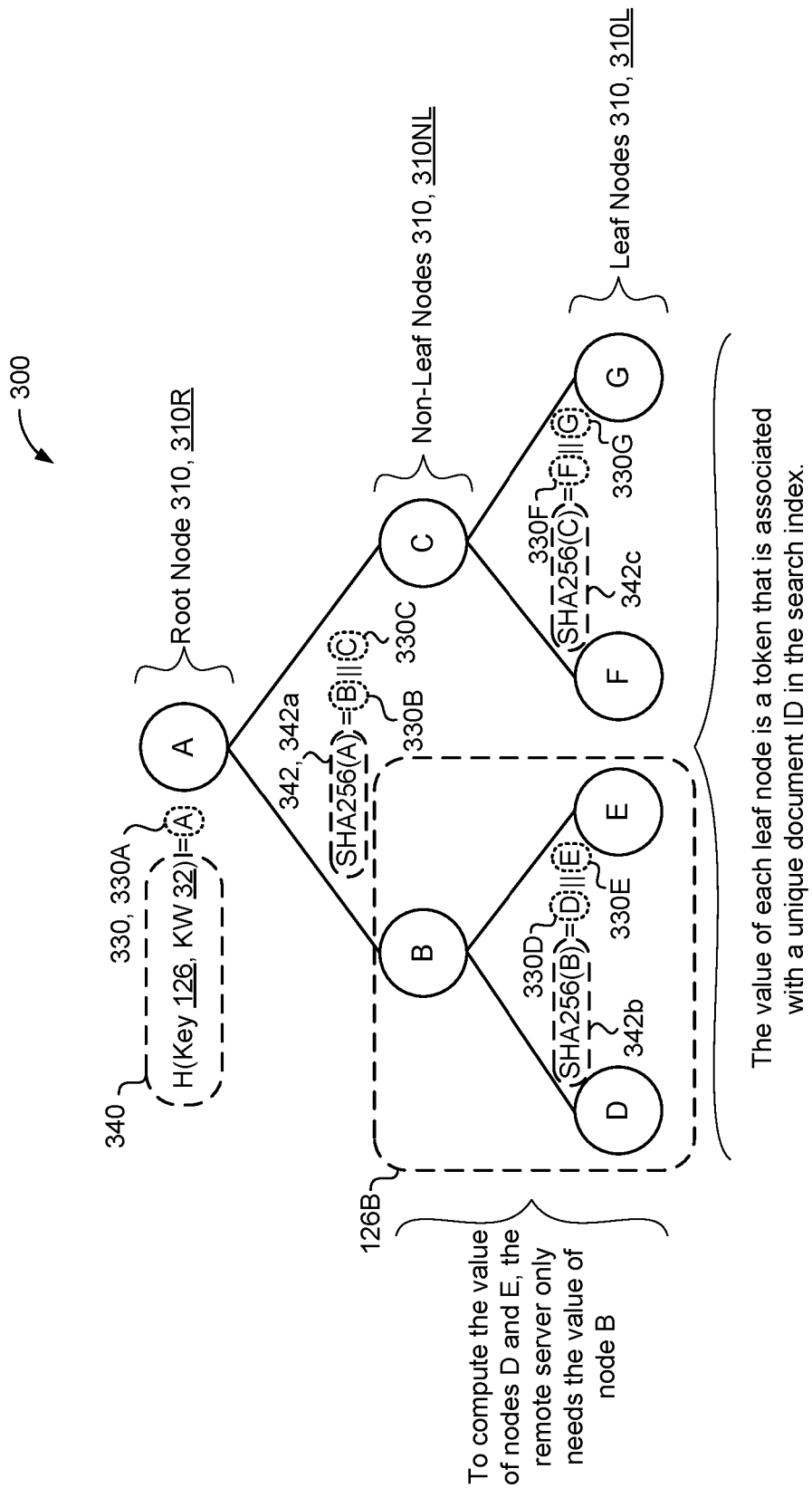
FIG. 3 is a schematic view of a binary tree.

Referring now to FIG. 3, as previously discussed, the SE manager 120 generates the DPRF 126 to solve for a range of values from $F(K, x_1), \ldots, F(K, x_m)$ by generating a binary tree 300. In some examples, the key K is associated with a specific keyword 32 and each x value of the DPRF 126 represents one of the documents 152 that the select keyword 32 appears in. For example, if the select keyword 32 is "cat", and the count value 212 associated with "cat" is 526, then cat appears in 526 unique documents 152. In this example, x would have a maximum size of 526 (e.g., 1 to 526) and each x would represent one of the documents 152 the keyword 32 appears in. Each value of F(K, x) is then associated with a value stored in the encrypted search index 160 that represents a document identifier 154 that the select keyword 32 appears in.

Thus, for the SE manager 120 to retrieve all of the documents 152 with the keyword "cat", the SE manager 120 and/or the untrusted storage device 150 may evaluate the DPRF 126 from F(K, 1), . . . , F(K, 526). Each of the 526 results are associated with a different value stored in the encrypted search index 160. In another example, the SE manager 120 may retrieve only a portion of the 526 documents 152 that include the keyword "cat". In this examples, the SE manager 120 and/or the untrusted storage device 150 would evaluate only a portion of the DPRF 126. For instance, to retrieve fifty documents 152, the SE manager 120 and/or the untrusted storage device 150 may evaluate F(K, 1), . . . , F(K, 50). Each of the fifty results are again associated with a different value stored in the encrypted search index 160. Similarly, to retrieve the next fifty documents, the SE manager 120 and/or the untrusted storage device 150 may evaluate F(K, 51), . . . , F(K, 100) and so on. In this way, the SE manager 120 and the untrusted storage device 150 may evaluate the DPRF 126 to obtain results associated with values within the encrypted search index 160 (i.e., entries 162). The untrusted storage device 150 may return all or some of the values associated with the results to the SE manager 120.

In some implementations, the SE manager 120, in response to receiving a search query 122, generates a DPRF 126 associated with the queried keyword 32 by generating the binary tree 300. In other implementations, the SE manager 120 generates a binary tree 300 for each keyword 32 in the count table 210 prior to receiving a search query 122. A binary tree is a tree data structure with a plurality of nodes where each node in the structure has at most two children. The binary tree 300 includes a set of nodes 310 that includes a root node 310R and a plurality of other nodes 310. The other nodes 310 are either non-leaf nodes 310NL or leaf nodes 310L. Each input value of x is uniquely assigned a leaf node 310L in ascending order. A quantity of leaf nodes 310L of the binary tree 300 may be equal to or greater than the count of unique documents 152 that include the associated keyword 32. For example, if the keyword "cat" has a count value 212 of 526, the SE manager 120 may generate a binary tree 300 for the keyword "cat" that has at least 526 leaf nodes 310L. Each of the 526 instances of "cat" is associated with a specific leaf node 310L.

Each node 310 is also associated with a value 330, 330A-N which herein may be referred to generally as "tokens". In some implementations, the value 330 of each leaf node 310L is associated with a value within an entry 162 of the encrypted search index 160. That is, each value 330 of each leaf node 310L of the binary tree 300 is associated with a value within the encrypted search index 160 that is associated with the corresponding keyword 32. Returning to the example of the keyword 32 "cat", each of the 526 leaf nodes 310L in the binary tree 300 generated for the keyword 32 "cat" may be associated with a value stored in the encrypted search index 160 and each of the associated values with the encrypted search index 160 corresponds to a document identifier 154 of a document 152 that includes the keyword 32 "cat".

In some implementations, the value 330 of root node 310R of the binary tree 300 is a value of a first hash 340 of the private cryptographic key 124 and the keyword 32 associated with the binary tree 300. Thus, each binary tree 300 will have a unique value 330R for each root node 310R for each binary tree 300 generated for a corresponding keyword 32. Each root node 310R is associated with a first child node (e.g., node 'B' in FIG. 3) and a second child node (e.g., node 'C' in FIG. 3). The first child node includes a first portion 330B of a second hash 342, 342a of the first hash 340 of the private cryptographic key 124 and the keyword 32, and the second child node includes a second portion 330C of the second hash 342 of the first hash 340 of the private cryptographic key 124 and the keyword 32. That is, in some examples, the value 330A of the root node 310R is the first hash 340 of the key 124 and the keyword 32. This value (labeled 'A' in FIG. 3) is then hashed (e.g., using SHA256) and the resulting second hash 342a is split into the first portion 330B and the second portion 330C. As used herein, the terms "hash" and "hash function" are used to indicate any one-way function (i.e., a function where the input cannot be determined from the output) and as such, is equally applicable to encryption operations (e.g., Advanced Encryption Standard (AES)) in addition to hash operations.

In some examples, the first portion 330B of the second hash 342 concatenated with the second portion 330C of the second hash 342 is equivalent to the second hash 342 of the first hash 340 of the private cryptographic key 124 and the keyword 32. As illustrated in FIG. 3, the second hash 342 (e.g., a SHA256 hash) is a hash of 330A (i.e., the root node 310R value 330A) and is equal to 'B' ||'C' (i.e., value 330B concatenated with value 330C). For example, the output of the SHA256 hash is a 256 bit number. The value 330B may be equivalent to the first 128 bits of the SHA256 output while the value 330C may be equivalent to the last 128 bits of the SHA256 output. Thus, the value 330B concatenated with the value 330C is equivalent to the hash 342 of the value of 330A.

In some implementations, each other node 310 of the binary tree 300 includes a portion of a hash 342 of a parent node 310 associated with the corresponding other node 310. That is, for each non-root node 310R of the binary tree 300 (i.e., all non-leaf nodes 310NL and all leaf nodes 310L), the value 330 of the node 310 may be a portion of a hash 342 of the parent node. With continued reference to FIG. 3, node 'B' (as with root node 310R node 'A") has two child nodes 310, node 'D' and node 'E'. Node 'C' also has 2 child nodes 310, node 'F' and node 'G'. As node 'D', node 'E', node 'F', and node 'G' have no child nodes 310, in this example each of these four nodes is a leaf node 310L. As previously discussed, the value 330B of node 'B' may be the first portion of the hash 342A of the value 330A of node 'A'. Similarly, the value 330B of node 'B' may be hashed (again with, for example, SHA256) and the resulting hash 342b may be split into a first portion 330D and a second portion 330E, each assigned as a value 330 of one of the two child nodes 310 (node 'D' and node 'E'). Also as previously discussed, the value 330C of node 'C' may be the second portion of the hash 342A of the value 330A of the node 'A'. Likewise, the value 330C of node 'C' may be hashed (e.g., with SHA256) and the resulting hash 342c may be split into a first portion 330F and a second portion 330G, each assigned as a value 330 of one of the two child nodes 310 (node 'F' and node 'G'). While in the illustrated example, the binary tree 300 stops at these nodes, the binary tree may continue on for any number of nodes 310 until there are a sufficient number of leaf nodes 310L to account for the count value 212 of the associated keyword 32.

To retrieve all of the document identifiers 154 associated with each leaf node 310L (i.e., every document identifier 154 associated with a document 152 that includes the queried keyword 32), the SE manager 120 may simply send the token of node 'A' (e.g., a hash of the key 124 and the keyword 32) and the count value 212 and allow the untrusted storage device 150 to determine the value for each leaf node 310L. In the example where the SE manager 120 needs to only retrieve a portion of the documents identifiers 154 associated with the keyword 32, the SE manager 120 may evaluate the first portion 126A and delegate just the second portion 126B to the untrusted storage device 150 to limit the information leaked to the untrusted storage device 150. For example, when the documents 152 include emails, the user 12, when querying for a keyword 32, may receive the 50 most recent emails that include the queried keyword 32 and only if the user indicates a desire for more results will additional emails be returned.

In some implementations, the document identifiers 154 are ordered chronologically (e.g., the document identifier 154 associated with the first leaf node 310L is the oldest document while the document identifier 154 associated with the last leaf node 310L is the newest document or vice versa), a range of leaf nodes 310L starting at the bottom left or the bottom right of the binary tree may be associated with the newest or oldest documents 152 associated with the keyword 32. This allows for returning only a portion of the document identifiers 154 associated with the queried keyword 32 (e.g., the fifty most recent documents 152) without the need look up each keyword 32 instance in the search index 160. This may drastically reduce the total amount of computation required. While in this example, chronological ordering is illustrated, the document identifiers 154 may of course be ordered based on any other desired criteria.

With continued reference to FIG. 3, in the example where the SE manager 120 needs only to retrieve the document identifiers 154 associated with the tokens 330D, 330E of node 'D' and node 'E', it is ideal to refrain from giving the untrusted storage device the information necessary to determine the values of node 'F' and node 'G', as these nodes are unnecessary for the query 122. In this case, the SE manager 120 may evaluate a first subset of the nodes 310 of the binary tree 300 and the untrusted storage device 150 may evaluate a second subset of the nodes 310 of the binary tree 300 that is different from the subset that that the SE manager 120 evaluated.

For example, when the SE manager 120, instead of providing the untrusted storage device 150 with the value 330A of the root node 310R, provides the untrusted storage device 150 with the value 330B of node 'B', the untrusted storage device 150 may evaluate the DPRF 126 (e.g., the binary tree 300) using the token 330B of node 'B' to obtain the values 330D, 330E of the leaf nodes 310L node 'D' and node 'E'. Because the hash function used to obtain the token 330B is a one-way function, the untrusted storage device 150 is not able to use that value to obtain the value 330A of the root node 310R and thus the tokens 330C, 330F, 330G of node 'C', node 'F', and node 'G'. Thus, by determining a minimal number of nodes 310 whose union of leaf nodes 310L covers exactly (and only) the set of values 330 that correspond to the range of document identifiers 154 to be retrieved, the amount of information provided to the untrusted storage device 150 is minimized while bandwidth requirements are kept low. To return additional document identifiers 154, the SE manager 120 may follow up by sending additional values 330 to the untrusted storage device (e.g., the value 330C of node 'C' to obtain the values 330F, 330G of node 'F' and node 'G').

In some implementations, each entry 162 of the encrypted index 160 is an association between exactly one keyword 32 and one document identifier 154. However, in some implementations, the search index 160 may be optimized without reducing privacy. Instead of each entry 162 of the encrypted index 160 including an association between one keyword 32 and one document identifier 154, each entry 162 may include an association between one keyword 32 and a plurality of document identifiers 154. That is, each entry 162 associates a keyword 32 to multiple document identifiers 154 that the keyword 32 appears in. Note that if there was no limit to how many document identifiers 154 each entry 162 could associate with a single keyword 32, the search index would risk leaking frequency table information. To mitigate this risk, each entry 162 may be limited to a maximum number of document identifiers. For example, each entry 162 may be limited to fifty or one hundred document identifiers 154. In practice, this ensures that keywords with large frequencies (i.e., appear in many documents 152) will be split into many different entries 162 in the search index 160.

In some examples, the maximum number of document identifiers may be dynamically changed based on the frequency of the keywords 32. As the frequency of the keyword 32 increases (i.e., the keyword 32 is more common in the documents 154), the size of the maximum number of document identifiers may increase. As a result, the untrusted storage device 150 does not have to process as many hashes. The count table 210 may be used to keep track of the maximum number of document identifiers for each keyword 32 as well as the number of document identifiers 154 currently associated with each entry 162. Optionally, instead of the count table 210 tracking the number of document identifiers 154 currently associated with each entry 162, the SE manager 120, each time a new keyword 32 is added, a SE manager 120 may create new entry 162 and add the keyword 32 to the new entry 162 based on a keyword probability. This leads to, on average, an expected number of document identifiers 154 to be added to the entry 1622 prior to the creation of another new entry 162. In this way, the count table 210 does not need to track the number of document identifiers 154 assigned to each entry 162, thus reducing the size of the count table 210.

Figure 4:
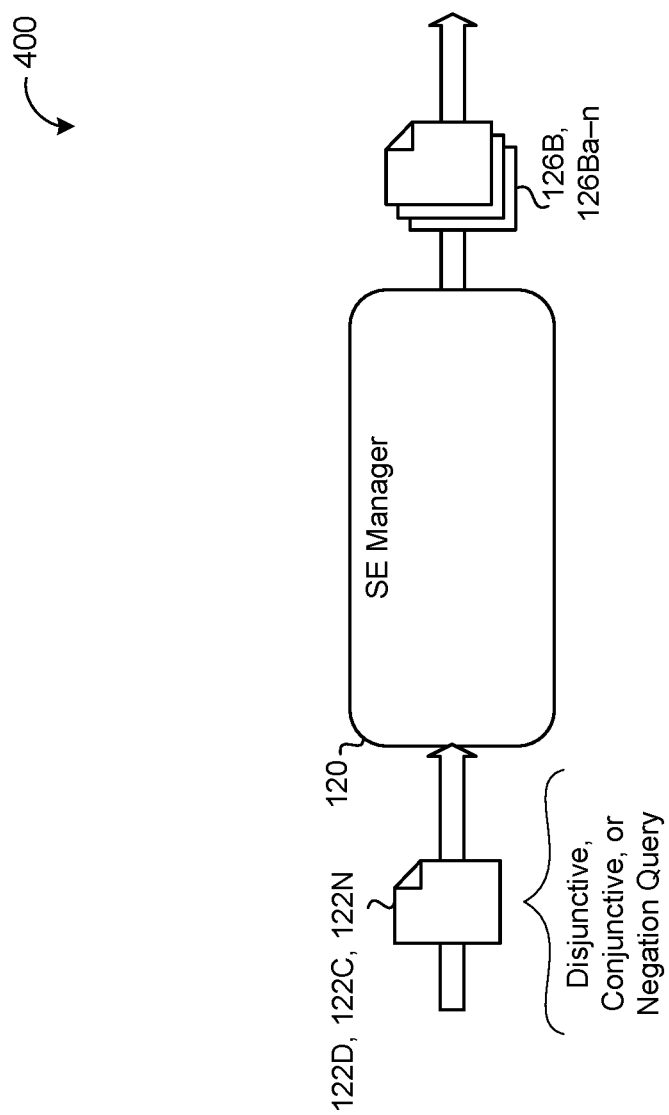
FIG. 4 is a schematic view of a searchable encryption manager and advanced queries.

Referring now to the schematic view 400 of FIG. 4, in some examples, the SE manager 120 receives a disjunctive, conjunctive, or negation search query 122D, 122C, 122N. A disjunctive query 122D includes a query of two or more keywords 32 combined with a logical OR. For example, a disjunctive query 122D may include a query for "cat" OR "dog" and should result in returning any document identifiers 154 associated with documents 152 that include either or both the keyword "cat" and the keyword "dog". For disjunctive queries 122D, the SE manager 120 may generate a DPRF 126 and a corresponding portion 126B, 126Ba-n for each keyword 32 separately. After receiving the document identifiers 154 for each keyword 32 at the user device 10, the SE manager 120 may combine the results and, in some implementations, rank the results using any metadata 156 returned with the document identifiers 154.

A conjunctive query 122C includes a query of two or more keywords 32 combined with a logical AND. For example, a conjunctive query 122C may include a query for "cat" AND "dog" and should result in returning any document identifiers 154 that are associated with documents 152 that include both "cat" and "dog". Similar to the disjunctive query 122D, for conjunctive queries 122C, the SE manager 120 may generate a DPRF 126 and a corresponding portion 126B for each keyword 32 separately. After receiving the document identifiers 154 for each keyword 32 at the user device 10, the SE manager 120 may return to the user 12 only document identifiers 154 that were returned for each keyword 32.

A negation query 122N includes a query for results that do not include one or more keywords 32. For example, a negation query 122N may include a query for all documents 152 that do not include the keyword "cat." For negation queries 122N, the SE manager 120 may generate a DPRF 126 and corresponding portion 126B for the negated keyword 32. After receiving the results for the negated keyword 32, the SE manager 120 may retrieve all document identifiers 154 and remove from the list the identifiers 154 associated with the negated keyword 32, and return the remaining results to the user 12. Using the above described methods for disjunctive queries 122D, conjunctive queries 122C, and negation queries 122N, complex queries 122 that combine or include multiple different types of queries may be resolved with the same techniques by splitting the complex query into multiple simpler queries.

Figure 5:
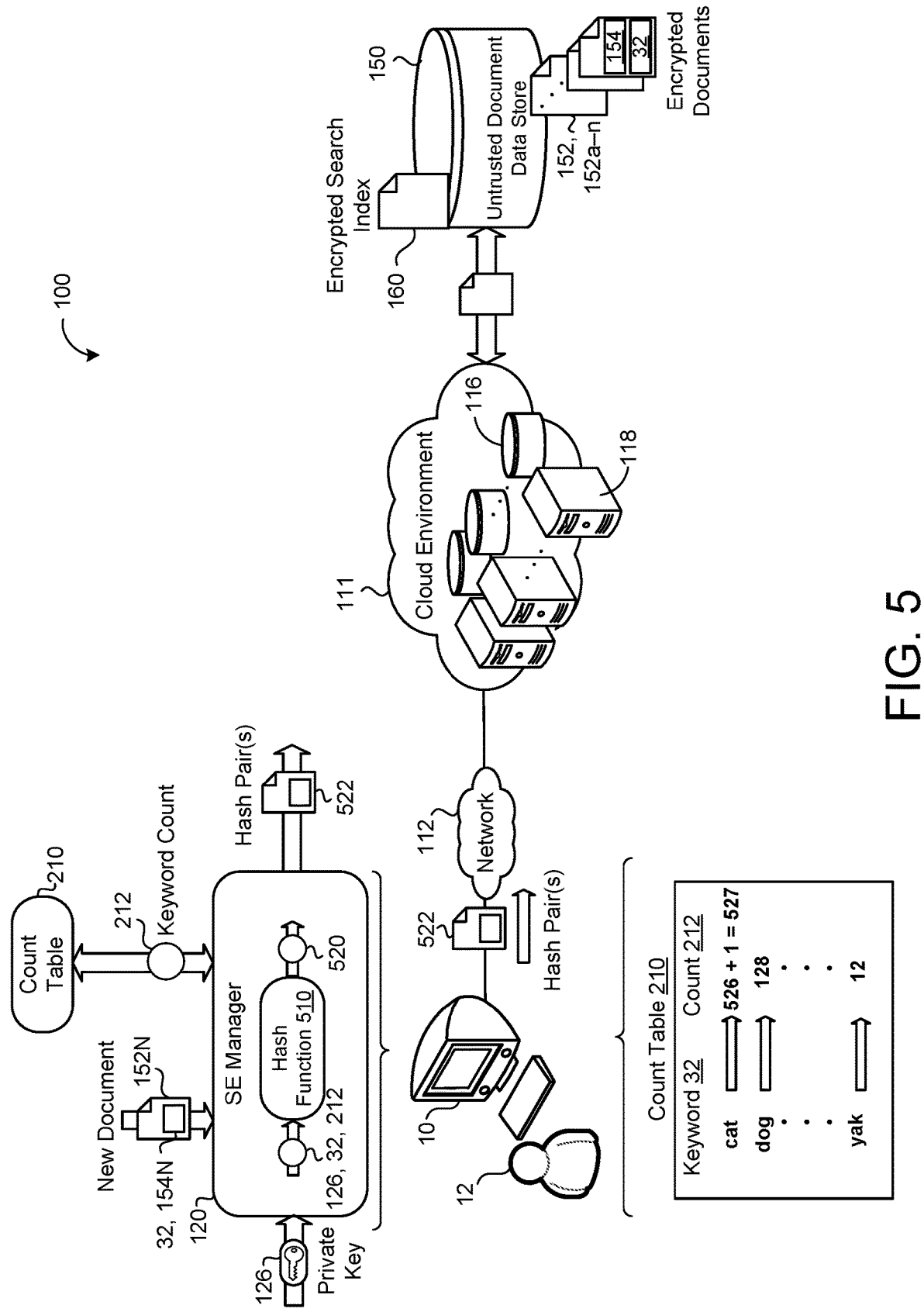
FIG. 5 is a schematic view of the example system adding a document to a corpus of encrypted documents.

Referring now to FIG. 5, in some examples, the system 100 shows the user 12 adding/uploading a new document 152N to the corpus of encrypted documents 152 stored on the untrusted storage device 150. In this situation, the encrypted search index 160 is updated with the keywords 32 present in the newly added document 152. The new document 152N is associated with a new document identifier 154N. In some implementations, for each unique keyword 32 of the new encrypted document 152N uploaded by the user 12 into the corpus of encrypted documents 152 stored on the untrusted storage device 150, the SE manager 120 increments the count 212 of unique documents 152 within the corpus of encrypted documents 152 that include the corresponding unique keyword 32 in the count table 210. For example, when the new document 152N includes the keyword "cat", and the current count 212 associated with the keyword "cat" is 526, the count 212 is incremented to 527.

The SE manager 120, in some examples, generates a unique keyword hash 520 based on the private cryptographic key 124, the corresponding unique keyword 32, and the incremented count 212 of unique documents 152 within the corpus of encrypted documents that include the corresponding unique keyword 32. For example, the SE manager 120 may use a hash function 510 to compute $H_{kw}=F(K\|kw, cnt_{kw})$, where $H_{kW}$ represents the hash value 520, K represents the private key 126, kw represents the keyword 32, and $cnt_{kw}$ represents the incremented count 212. Any suitable one-way function or algorithm may be used to hash or encrypt the keyword 32 (e.g., SHA256).

The SE manager 120 may also generate a hash pair 522 that includes the unique keyword hash 520 and an encrypted document identifier 154N (i.e., the SE manager 120 hashes or encrypts the new document identifier 154N) associated with the new encrypted document 152 uploaded by the user 12. The SE manager 120 sends the hash pair 522 to the untrusted storage device 150. The SE manager 120 may generate a separate and unique hash pair 522 for each unique keyword 32 within the newly uploaded document 152N.

Draft documents 152 (e.g., emails that are saved without sending or are actively being composed) are typically saved frequently (e.g., every few seconds) by the user device 10. The SE manager 120 may update the search index 160 at the same frequency as the draft is saved or at a different frequency. For example, when the draft is saved every 5 seconds, the SE manager 120 may update the encrypted search index 160 every 5 minutes. In some implementations, the SE manager 120 may update the encrypted search index 160 at the same rate as the draft is saved, but update the count table 210 at a slower frequency. In this case, tokens 330 may temporarily be reused for updating the search index 160 until the count table 210 is updated at a future time.

When the documents 152 stored on the untrusted storage device 150 are emails, the SE manager 120 may automatically add received emails at the user device 10 to the corpus of encrypted emails on the untrusted storage device. In some examples, emails that have been received, but not yet opened, are not added to the search index 160. That is, in some examples, the SE manager 120 automatically adds opened emails to the search index 160. In this way, an email may be revoked by the sender without the SE manager 120 and/or the untrusted storage device 150 inferring content of the revoked email from the keywords 32.

Figure 6:
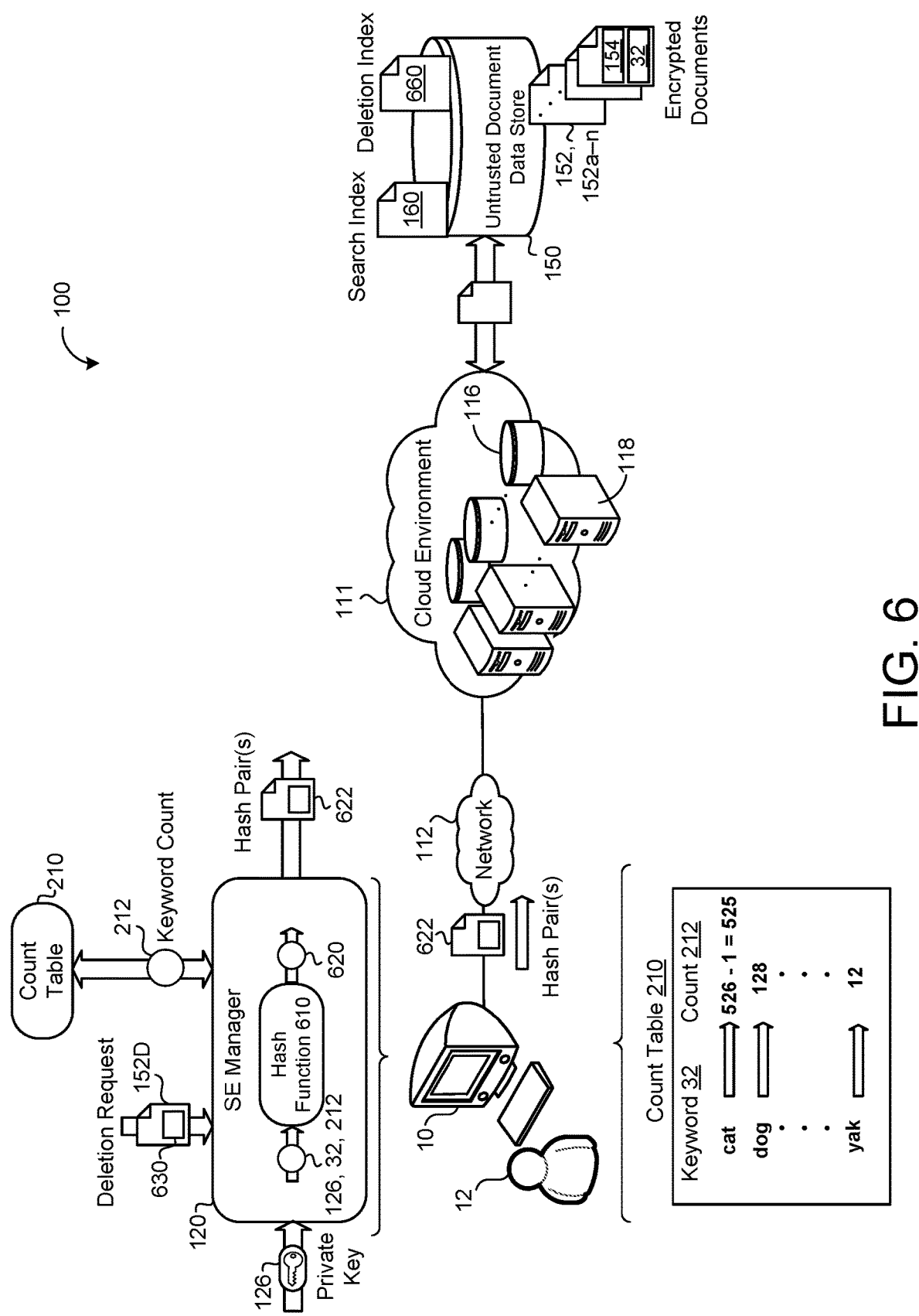
FIG. 6 is a schematic view of the examples system deleing a document from the corpus of encrypted documents.

Referring now to FIG. 6, similar to adding a document 152, the system 100 shows the SE manager 120, in some implementations, receiving a deletion request 630 to delete a document 152 from the untrusted storage device 150. In this case, the SE manager 120 retrieves each keyword 32 present in the document 152 to be deleted (e.g., from the untrusted storage device 150) and, for each keyword 32, decrements the corresponding count 212 in the count table 210. The SE manager then instructs the untrusted storage device to delete the values within the encrypted search index associated with the deleted document 152D. For example, the SE manager 120 may generate a hash 620 of the private key 124, the keyword 32, and the appropriate count 212 (or other identifier) using a hash function 610 to generate a hash pair 622 with the document identifier 154. The SE manager 120 may send the hash pairs 622 to the untrusted storage device 150 to indicate to the untrusted storage device which entries within the encrypted search index 160 to delete. The untrusted storage device 150 may run a periodic task to update the search index 160 at regular intervals. In some implementations, the untrusted storage device 150 keeps a list of all document identifiers 154 of deleted documents 152, and prior to returning results from a search query 122, removes any document identifiers 154 that are associated with deleted documents 152.

Optionally, the untrusted storage device 150 may periodically compress (e.g., perform garbage collection) the search index 160 after one or more documents 152 have been deleted. After a document is deleted, the deleted document may create a "hole" at the count 212 associated with the deleted document 152. The untrusted storage device 150 may move or shift entries in the search index 160 with higher counts 212 to ones of lower counts as the lower counts become available from document deletions. The resulting empty higher count entries may then be deleted from the search index 160.

In some scenarios, the user 12 may desire to delete portions of a document 152 without deleting the entire document 152. In this situation, some keywords 32 are removed from the document 152 and the encrypted search index 160 no longer accurately reflects the keywords 32 present in the modified documents 152. In some implementations, a deletion index 660 includes reference to keywords 32 deleted from documents 152 stored within the corpus of encrypted documents on the untrusted data storage 150. The deletion index 660 may be generated and maintained similarly to when new document keywords 32 are added to the search index 160. Prior to the untrusted storage device 150 returning the document identifiers 154 associated with the queried keyword, the untrusted storage device may reference the deletion index 660 to determine if the deletion index 660 indicates that any of the document identifiers 154 include keywords 32 that have been deleted. The untrusted storage device 150 may remove document identifiers 154 that the deletion index indicates the queried keyword 32 was deleted from.

In order to prevent zero-day leakage (e.g., frequency table attacks), it is important that the plaintext of the count table 210 is not available to anyone other than the user 12. However, it is also desirable that the user 12 have easy access to the count table 210 from a variety of user devices 10 simultaneously. There are a variety of methods for storing the count table 210 that address these concerns to varying degrees. For example, the count table may be stored only locally on the user device 10. However, this implementation has significant drawbacks in that the user is limited to only the user device 10 that the count table 210 is stored on, and it would be difficult if not impossible to recover the count table 210 if the user device 10 loses it (e.g., the user device 10 crashes).

Another implementation is storing the count table 210 in an encrypted format on the untrusted storage device 150. The count table 210 may be encrypted with a second private cryptographic key that is different from the private cryptographic key 124, or alternatively the count table 210 may be encrypted with the same private key 124. The user device 10 may then, when performing a query, first download the encrypted count table 210 from the untrusted storage server 150, decrypt it, and perform the query. The user device 10 may send to the untrusted storage device 150 an updated count table 210 each time a document 152 is added or removed from the corpus of encrypted documents. This allows for synchronization between multiple user devices 10 and ensures backups in case a user device crashes, however, the bandwidth requirements may be significant, especially for some user devices (e.g., mobile phones). At the cost of greatly increased complexity, the untrusted storage device 150 may instead store incremental backups of the count table 210. For example, the backup may be uploaded at regular intervals (e.g., once a day or every few hours). User devices may upload changes to the count table 210 (e.g., adding or deleting a document 152) and the untrusted storage device 150 may track these changes to the count table 210 until the next backup upload.

Yet another implementation for storing the count table 210 involves storing an encrypted count table 210 on the untrusted storage device 150 and accessing encrypted entries of the count table 210. For example, for each keyword 32, the untrusted storage device 150 may store an identifier encrypted with a unique key that points to an encryption of the count 212 for that keyword. When the user 12 adds a document 152, the user 12 requests the untrusted storage device to return the encrypted counts 212 associated with the identifier. The user device 10 may then perform a search as described above using the recovered counts 212, and then send encrypted incremented counts back to the untrusted storage device 150 for the untrusted storage device 150 to update. This implementation provides protection from crashed user devices and minimizes the bandwidth required. However, logs of accessing the encrypted counts, if not properly deleted, may leak frequency information. This frequency information may allow for the generation of a frequency table which may be used in an attack.

In yet another implementation, the count table 210 is instead replaced with a single max count integer. The max count integer may be set to the largest count 212. That is, the max count integer may be set the count 212 of the keyword 32 with the highest count 212 (i.e., appears in the most documents 152). When searching for a keyword 32, the SE manager 120 may delegate to the untrusted storage device 150 a DPRF 126 over the entire range up to the max count integer. The untrusted storage device may perform a search (e.g., a binary search) over the encrypted search index 160 to obtain the actual count 212 of the queried keyword 32. For example, the untrusted storage device 150 may determine that the largest count value that matches a result in the encrypted search index 160 is the actual count 212 of the keyword. This implementation removes the need for the count table 210, but increases the number of lookups the untrusted storage device 150 must perform on the encrypted search index 160 while also potentially degrading privacy, as logs of the search may leak a frequency of counts of keywords 32.

In yet another implementation, the count table 210 is partitioned into a plurality of different access buckets. Here, the partitioning may use k-anonymity, whereby k-anonymity refers to a property of anonymized data where a specific member of a population cannot be readily identified or distinguished from the data.

Figure 7:
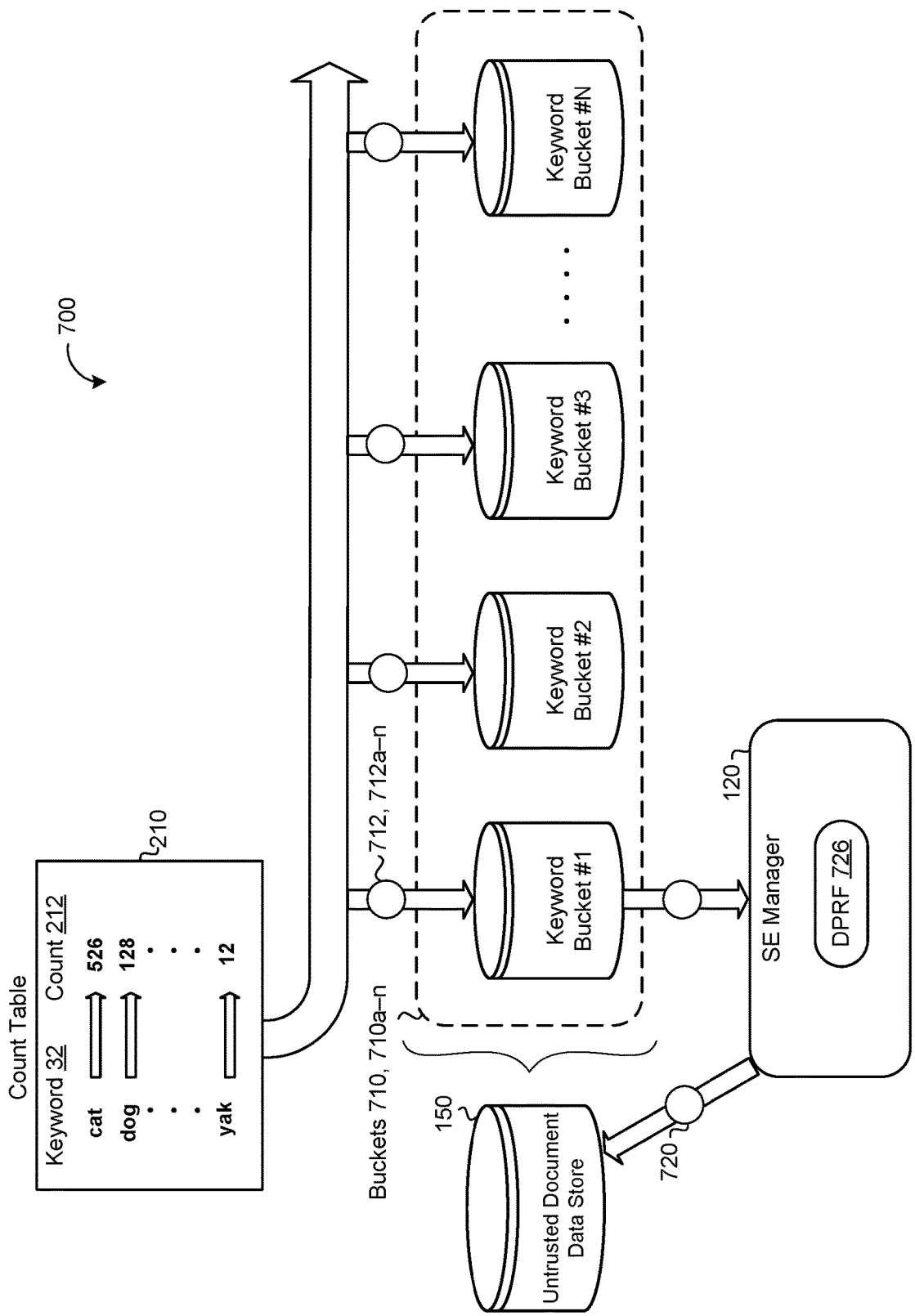
FIG. 7 is a schematic view of an untrusted storage device and count table bucketization.

Referring now to the schematic view 700 of FIG. 7, in some implementations, the SE manager 120 divides the count table 210 into a plurality of buckets 710, 710*a-n* and stores the buckets 710 on the untrusted storage device 150. Here, each bucket 710 stores one or more counts 212 of unique documents 152 within the corpus of encrypted documents 152 that include a respective keyword 32. That is, each keyword 32 and associated count 212 pair 712, 712*a-n* (e.g., "cat" and 526) are encrypted and assigned to a bucket 710 and each bucket is stored on the untrusted storage device 150. The untrusted storage device 150 may host any number of buckets 710 and each bucket 710 may store any number of keyword-count pairs 712, however each keyword-count pair 712 is only assigned to a single bucket 710. The SE manager 120 may request a specific pair 712 (e.g., a count 212 for a specific keyword 32) by generating and sending a bucket request 720 to the untrusted storage device 150 that indicates a specific bucket 710 of the plurality of buckets 710. In response, the untrusted storage device 150 returns each pair 712 stored in the specific bucket 710. In this way, the untrusted storage device 150 cannot discern the specific pair 712 from the bucket of pairs that the untrusted storage device 150 returned to the SE manager 120. The SE manager 120 may determine which bucket 710 a pair 712 is assigned to by generating second DPRF 726 whose output domain is simply the number of buckets 710.

The bandwidth required for bucketization is balanced against the strength of the anonymity the bucketization provides. That is, the greater the number of keyword and count pairs 712 per bucket 710 (i.e., when the total number of buckets 710 is small), the greater number of pairs 712 returned for each query 122, the greater the anonymity, and the greater the bandwidth consumption. Conversely, the fewer the number of keyword and count pairs 712 per bucket 710 (i.e., when the total number of buckets 710 is large), the fewer number of pairs 712 returned for each query 122, the less the anonymity, and the less the bandwidth consumption. This implementation ensures that, even if logs generated by the untrusted storage device are not deleted, the leakage is mitigated by the k-anonymity techniques. In particular, the leakage of frequencies occur at the granularity of buckets (which typically will contain k encrypted pairs 712) and therefore the frequency leakage only leaks frequencies for groups of approximately k keywords 32.

In some examples, the total number of buckets 710 is fixed. That is, the number of buckets 710 in use does not change and new keyword count pairs 712 are continually added to the same buckets 710. Over time, as the number of keyword count pairs 712 per bucket increases, the overall bandwidth consumption of the bucketization technique similarly increases. In other examples, the number of buckets 710 is not fixed (i.e., dynamic bucketization). In this case, the output domain of the second DPRF 726 is a maximum number of buckets that may be deployed (e.g., 1024). As with the fixed bucket implementation, the second DPRF 726 is used to assign the keyword count pair 712 to the buckets 710. To reduce the number of bucket 710 from the maximum amount assigned by the second DPRF 726 to a desired amount, different possible outputs of the second DPRF 726 may be combined into a single bucket 710. That is, two or more buckets 710 may be dynamically associated together.

For example, if 1,024 is the maximum number of buckets, but the target number of buckets is 64, every 16 buckets 710 may be combined, such that when a keyword-count pair 712 from one of the 16 buckets is requested, the untrusted storage device 150 will return all of the pairs 712 from each of the 16 buckets. Note that each group of buckets 710 does not have to constitute the same number of buckets 710. For example, one group may be 16 buckets, while another group is 32 buckets. To increase or decrease the number of buckets 710, the SE manager 120 may simply change the number of buckets 710 that are combined. This allows the SE manager 120 to dynamically change the number of buckets 710 in use without physically changing the underlying count table 210. When the count table 210 is stored in a sorted order, dynamic bucketization also ensures that counts 212 that are placed into the same bucket 710 are logically nearby for efficiency purposes.

FIG. 8 shows a plot 800 depicting a likelihood of inserting a new keyword 32 into the count table 210 when a probability 810 to enter keyword is 0.02. The plot 800 has an x-axis denoting a number of documents 152 with the same new keyword 32 and a y-axis denoting a probability or likelihood that the new keyword 32 is added to the count table 210. As is apparent from the plot 800, as the number of documents 152 with the new keyword 32 approaches 200, the probability that the keyword 32 is entered approaches 100 percent. In some implementations, a size of the count table 210 is reduced by adding new keywords 32 to the count table 210 based on a probability. That is, when a new document 152N (FIG. 5) is added to the corpus of encrypted documents stored on the untrusted storage device 150, when the new document 152N contains a keyword 32 that is not already in the count table 210, the SE manager 120 may determine whether to add the keyword 32 to the count table 210 based on a probability 810. For example, the probability 810 that a new keyword 32 is added to the count table 210 may be 1 in 50 (i.e., 2 percent). When the SE manager 120 determines, based on the probability 810, that the keyword 32 is to be added to the count table 210 (e.g., 2% of the time), the keyword 32 is added as described with regards to FIG. 5. When the SE manager 120 determines, based on the probability 810, that the keyword 32 is not to be added to the count table 210, the SE manager 120 may instead randomly assign the keyword 32 to a token 330 within a threshold range. In some examples, the threshold range may be the default number of documents identifiers 154 that are retrieved in response to a search query (e.g., fifty).

For example, when the SE manager 120 determines to not add a new keyword 32 to the count table 210, the SE manager 120 may instead generate a hash pair 522 as described with regard to FIG. 5 using a random count value 212 between one and fifty. The new keyword 32, as it is used in additional documents, will eventually be added to the count table 210 (i.e., eventually, based on the probability 810, the keyword 32 will be added to the count table 210).

While there is a chance that some tokens 330 will be used for multiple documents 152, i.e., when randomly selecting the count value 212 between 1 and 50, the same number is randomly selected more than once, due to the nature of the infrequent keyword 32 and the strong likelihood that the keyword 32 will eventually be added to the count table 210, the amount of information leaked from sharing the token 330 is minimal. At most, the untrusted storage device 150 may learn that each document 152 that shares the same token 300 has a keyword 32 in common. The untrusted storage device 150 does not learn what the keyword 32 is or the total number of documents 152 that include the keyword 32. This technique may drastically reduce the size of the count table 210, as rarely used keywords (e.g., symbols, acronyms, names, etc.) will not be included. This decreases both the storage cost of storing the count table 210 and the communication costs during count table operations (e.g., with regards to FIG. 7).

Figure 9:
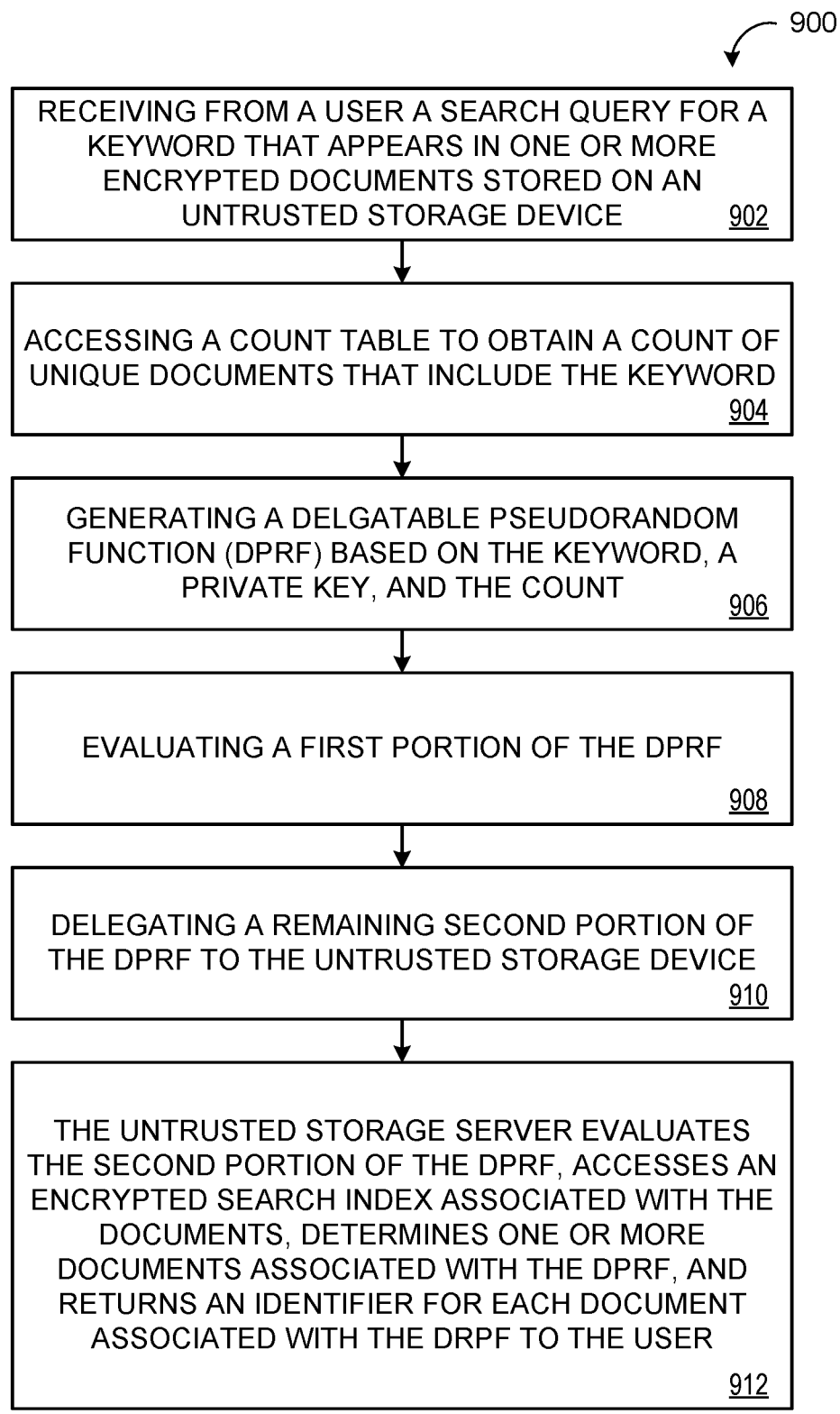
FIG. 9 is a flowchart of an example arrangement of operations for a method of providing encrypted search with no zero-day leakage.

FIG. 9 is a flowchart of an exemplary arrangement of operations for a method 900 of providing encrypted search with no zero-day leakage. The method 900 includes, at step 902, receiving, at data processing hardware 18 of a user device 10 associated with a user 12, a search query 122 for a keyword 32. The keyword 32 appears in one or more encrypted documents 152 within a corpus of encrypted documents 152 stored on an untrusted storage device 150. The method 900 includes, at step 904, accessing, by the data processing hardware 18, a count table 210 to obtain a count 212 of unique documents 152 within the corpus of encrypted documents 152 that include the keyword 32 and, at step 906, generating, by the data processing hardware 18, a delegatable pseudorandom function (DPRF) 126 based on the keyword 32, a private cryptographic key 124, and the count 212 of unique documents 152 that include the keyword 32.

At step 908, the method 900 includes evaluating, by the data processing hardware 18, a first portion of the DPRF 126A, and at step 910, delegating, by the data processing hardware 18, a remaining second portion of the DPRF 126B to the untrusted storage device 150. The remaining second portion of the DPRF, when received by the untrusted storage device 150, causes the untrusted storage device 150 to, at step 912, evaluate the remaining second portion of the DPRF 126B, access an encrypted search index 160 associated with the corpus of encrypted documents 152 stored on the untrusted storage device 150, and determine one or more encrypted documents 152 within the corpus of encrypted documents 152 associated with the remaining second portion of the DPRF 126B based on the encrypted search index 160. The untrusted storage device 150 also returns, to the user device 10, an identifier 154 for each encrypted document 152 of at least a portion of the one or more encrypted documents 152 associated with the remaining second portion of the DPRF 126B.

Figure 10:
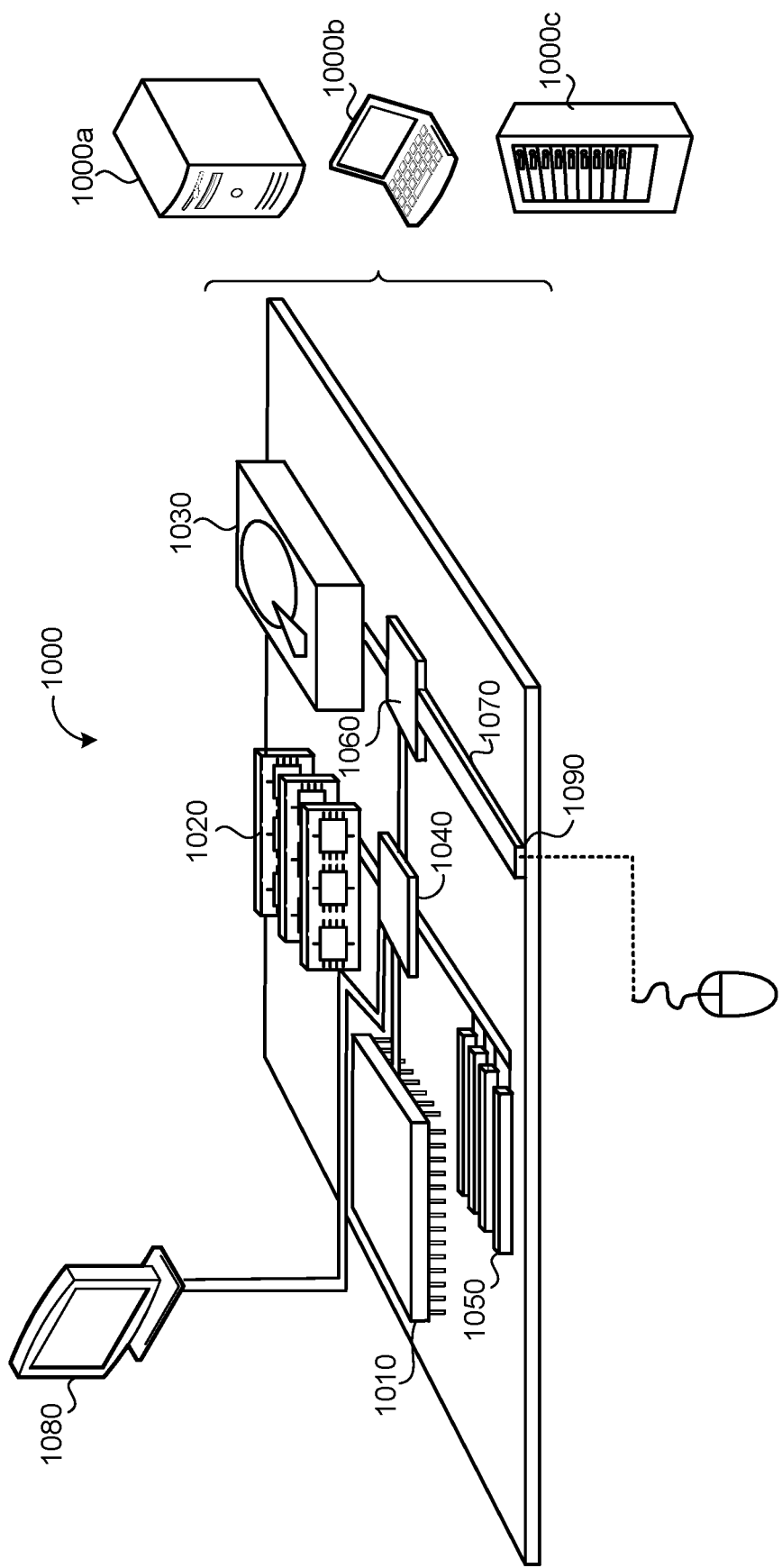
FIG. 10 is a schematic view of an example computing device that may be used to implement the systems and methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000*a* or multiple times in a group of such servers 1000*a*, as a laptop computer 1000*b*, or as part of a rack server system 1000*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a search query for a keyword appearing in one or more encrypted documents within a corpus of encrypted documents stored on an untrusted storage device;
   generating a delegatable pseudorandom function (DPRF) based on the keyword, a private cryptographic key, and a count of unique documents within the corpus of encrypted documents that include the keyword;
   evaluating a first portion of the DPRF;
   delegating a remaining second portion of the DPRF to the untrusted storage device; and
   receiving, from the untrusted storage device, an identifier for each encrypted document of at least a portion of the one or more encrypted documents associated with the remaining second portion of the DPRF.

2. The computer-implemented method of claim 1, wherein the operations further comprise accessing a count table to obtain the count of unique documents within the corpus of encrypted documents that include the keyword.

3. The computer-implemented method of claim 1, wherein delegating the remaining second portion of the DPRF to the untrusted storage device causes the untrusted storage device to:
   evaluate the remaining second portion of the DPRF;
   access an encrypted search index associated with the corpus of encrypted documents stored on the untrusted storage device; and
   determine one or more encrypted documents within the corpus of encrypted documents associated with the remaining second portion of the DPRF based on the encrypted search index.

4. The computer-implemented method of claim 1, wherein generating the DPRF comprises:
   generating a binary tree comprising a set of nodes that includes a root node and a plurality of other nodes, each other node comprising a non-leaf node or a leaf node, wherein a quantity of leaf nodes of the binary tree is equal to or greater than the count of unique documents that include the keyword.

5. The computer-implemented method of claim 4, wherein:
   the root node of the binary tree comprises a first hash of the private cryptographic key and the keyword; and
   the root node is associated with a first child node and a second child node, the first child node comprising a first portion of a second hash of the first hash of the private cryptographic key and the keyword, and the second child node comprising a second portion of the second hash of the first hash of the private cryptographic key and the keyword.

6. The computer-implemented method of claim 5, wherein the first portion of the second hash concatenated with the second portion of the second hash is equivalent to the second hash of the first hash of the private cryptographic key and the keyword.

7. The computer-implemented method of claim 4, wherein each leaf node of the set of nodes of the binary tree is associated with a value stored in an encrypted search index.

8. The computer-implemented method of claim 4, wherein each other node of the set of nodes of the binary tree comprises a portion of a hash of a parent node associated with the corresponding other node.

9. The computer-implemented method of claim 4, wherein evaluating the first portion of the DPRF comprises evaluating a first subset of the set of nodes of the binary tree.

10. The computer-implemented method of claim 9, wherein the untrusted storage device evaluates a second subset of the set of nodes of the binary tree, the second subset comprising different nodes from the set of nodes of the binary tree than the first subset.

11. A system comprising:
   data processing hardware of a user device associated with a user; and
   memory hardware in communication with the data processing hardware, the memory hardware storing instructions that when executed on the data processing hardware cause the data processing hardware to perform operations comprising:
      receiving a search query for a keyword appearing in one or more encrypted documents within a corpus of encrypted documents stored on an untrusted storage device;
      generating a delegatable pseudorandom function (DPRF) based on the keyword, a private cryptographic key, and a count of unique documents within the corpus of encrypted documents that include the keyword;
      evaluating a first portion of the DPRF;
      delegating a remaining second portion of the DPRF to the untrusted storage device; and
      receiving, from the untrusted storage device, an identifier for each encrypted document of at least a portion of the one or more encrypted documents associated with the remaining second portion of the DPRF.

12. The system of claim 11, wherein the operations further comprise accessing a count table to obtain the count of unique documents within the corpus of encrypted documents that include the keyword.

13. The system of claim 11, wherein delegating the remaining second portion of the DPRF to the untrusted storage device causes the untrusted storage device to:
   evaluate the remaining second portion of the DPRF;
   access an encrypted search index associated with the corpus of encrypted documents stored on the untrusted storage device; and
   determine one or more encrypted documents within the corpus of encrypted documents associated with the remaining second portion of the DPRF based on the encrypted search index.

14. The system of claim 11, wherein generating the DPRF comprises:

generating a binary tree comprising a set of nodes that includes a root node and a plurality of other nodes, each other node comprising a non-leaf node or a leaf node, wherein a quantity of leaf nodes of the binary tree is equal to or greater than the count of unique documents that include the keyword.

15. The system of claim 14, wherein:

the root node of the binary tree comprises a first hash of the private cryptographic key and the keyword; and the root node is associated with a first child node and a second child node, the first child node comprising a first portion of a second hash of the first hash of the private cryptographic key and the keyword, and the second child node comprising a second portion of the second hash of the first hash of the private cryptographic key and the keyword.

16. The system of claim 15, wherein the first portion of the second hash concatenated with the second portion of the second hash is equivalent to the second hash of the first hash of the private cryptographic key and the keyword.

17. The system of claim 14, wherein each leaf node of the set of nodes of the binary tree is associated with a value stored in an encrypted search index.

18. The system of claim 14, wherein each other node of the set of nodes of the binary tree comprises a portion of a hash of a parent node associated with the corresponding other node.

19. The system of claim 14, wherein evaluating the first portion of the DPRF comprises evaluating a first subset of the set of nodes of the binary tree.

20. The system of claim 19, wherein the untrusted storage device evaluates a second subset of the set of nodes of the binary tree, the second subset comprising different nodes from the set of nodes of the binary tree than the first subset.

* * * * *